United States Patent
Zarringhalam et al.

(10) Patent No.: US 12,275,423 B2
(45) Date of Patent: Apr. 15, 2025

(54) SYSTEMS AND METHODS FOR TRANSITING BETWEEN AUTOMATED DRIVING OPERATIONAL MODES

(71) Applicant: GM GLOBAL TECHNOLOGY OPERATIONS LLC, Detroit, MI (US)

(72) Inventors: Reza Zarringhalam, Whitby (CA); Dorothy Lui, North York (CA); Jimmy Lu, Markham (CA); Milad Jalaliyazdi, Richmond Hill (CA); Kurt L Fischer, Waterfordd, MI (US); Jameson M Collins, Dexter, MI (US); Zachary Lott, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

(21) Appl. No.: 18/063,328

(22) Filed: Dec. 8, 2022

(65) Prior Publication Data

US 2024/0190455 A1 Jun. 13, 2024

(51) Int. Cl.
*B60W 50/14* (2020.01)
*B60W 10/20* (2006.01)
(Continued)

(52) U.S. Cl.
CPC ............ *B60W 50/14* (2013.01); *B60W 10/20* (2013.01); *B60W 30/09* (2013.01);
(Continued)

(58) Field of Classification Search
CPC .... B60W 50/14; B60W 60/005; B60W 10/20; B60W 30/09; B60W 30/0956;
(Continued)

(56) References Cited

U.S. PATENT DOCUMENTS

2020/0290646 A1 * 9/2020 Safour ................. B60W 50/14
2022/0266869 A1 * 8/2022 Ito ..................... B60W 60/0057
(Continued)

FOREIGN PATENT DOCUMENTS

WO WO-2018122966 A1 * 7/2018 ............ B60W 10/04

*Primary Examiner* — James J Yang
*Assistant Examiner* — Anthony D Afrifa-Kyei
(74) *Attorney, Agent, or Firm* — Lorenz & Kopf LLP

(57) ABSTRACT

Systems and methods are provided for managing transitions between operational modes of a vehicle. The system includes a controller configured to, by a processor: automatically transition between vehicular operational modes without initiation by the driver including a hands-off autonomous driving mode in which the processor controls lateral steering of the vehicle, a hands-on driving assistance mode in which the processor controls the lateral steering of the vehicle while the driver is holding the steering wheel, and a no control mode in which the driver controls the lateral steering of the vehicle. The transition between the operational modes is based on sensed data. The hands-off autonomous driving mode is prioritized over the hands-on driving assistance mode which is prioritized over the no control mode. The controller is further configured to display on a human-machine-interface a notification indicating that at least one of the operational modes is active or not available.

16 Claims, 8 Drawing Sheets

(51) Int. Cl.
  *B60W 30/09* (2012.01)
  *B60W 30/095* (2012.01)
  *B60W 30/12* (2020.01)
  *B60W 30/182* (2020.01)
  *B60W 40/105* (2012.01)
  *B60W 60/00* (2020.01)

(52) U.S. Cl.
  CPC ........ *B60W 30/0956* (2013.01); *B60W 30/12* (2013.01); *B60W 30/182* (2013.01); *B60W 40/105* (2013.01); *B60W 60/005* (2020.02); *B60W 2050/146* (2013.01); *B60W 2510/202* (2013.01); *B60W 2554/4041* (2020.02); *B60W 2554/80* (2020.02)

(58) Field of Classification Search
  CPC .. B60W 30/12; B60W 30/182; B60W 40/105; B60W 2554/4041; B60W 2554/80; B60W 2050/146; B60W 2510/202; B60W 50/10; B60W 50/00; B60W 50/08; B60W 30/16; B60W 2540/12; B60W 2540/215; B60W 2720/10; B60W 2754/30; B60W 50/082; B60W 30/143; B60W 50/085; B60W 60/0051; B60W 60/0053; B60W 60/0059; B60W 2420/403; B60W 2520/10; B60K 35/00; B60K 35/10; B60K 35/25; B60K 35/28; B60K 35/60; B60K 35/658; B60K 2310/00; B60K 2310/30; B60K 2360/11; B60K 2360/1438; B60K 2360/145; B60K 2360/172; B60K 2360/782; B60K 35/23; B62D 15/026; B62D 15/00; B62D 15/02; B62D 15/025

See application file for complete search history.

(56) References Cited

U.S. PATENT DOCUMENTS

2023/0234600 A1\* 7/2023 Craigen ............ B60W 60/0053
  340/438
2023/0339515 A1\* 10/2023 Hayakawa ........ B60W 60/0027

\* cited by examiner

SYSTEMS AND METHODS FOR TRANSITING BETWEEN AUTOMATED DRIVING OPERATIONAL MODES

INTRODUCTION

The technical field generally relates to vehicles, and more particularly relates to systems and methods for transitioning between two or more automated driving operational modes of a vehicle that use driving assistance modes for controlling steering of the vehicle.

Various modern vehicles include driving assistance systems capable of performing various levels of autonomous, semi-autonomous, and intermittent steering control. However, transitioning between these systems may result in abrupt changes in the operation of the vehicle, especially when the systems are independent from one another. Further, a driver may be required to manually transition between these systems.

Accordingly, it is desirable to provide systems and/or methods capable of managing transitions between various driving assistance systems in a manner that reduces the likelihood of abrupt changes in operation of the vehicle. In addition, it is desirable to provide systems and methods that are capable of automatically transitioning between such systems without driver initiation. Furthermore, other desirable features and characteristics of the present invention will become apparent from the subsequent detailed description and the appended claims, taken in conjunction with the accompanying drawings and the foregoing technical field and background.

SUMMARY

A system is provided for managing transitions between operational modes of a vehicle. In one embodiment, the system includes a controller configured to, by a processor: automatically transition a vehicle between multiple operational modes without initiation by a driver of the vehicle, the operational modes including a hands-off autonomous driving mode in which the processor controls lateral steering of the vehicle while the driver is not required to hold a steering wheel of the vehicle, a hands-on driving assistance mode in which the processor controls the lateral steering of the vehicle while the driver is required to hold the steering wheel, and a no control mode in which the driver controls the lateral steering of the vehicle with the steering wheel. The automatic transition between the operational modes of the vehicle is based on sensed driver activity and vehicle dynamics. The hands-off autonomous driving mode is prioritized over the hands-on driving assistance mode and the hands-on driving assistance mode is prioritized over the no control mode. The controller is further configured to display on a human-machine-interface of the vehicle a notification indicating that at least one of the operational modes is active or not available.

In various embodiments, the controller is configured to, by the processor, operate the vehicle in the hands-on driving assistance mode by automatically activating a hands-on lane centering assistance mode without initiation by the driver, wherein the hands-on lane centering assistance mode is configured to control, while active, the lateral steering of the vehicle to direct the vehicle toward a center of a lane of a road on which the vehicle is traveling.

In various embodiments, the controller is configured to, by the processor: receive data that includes a status of an adaptive cruise control system of the vehicle configured to control a speed of the vehicle, an acceleration of the vehicle, a torque of the vehicle applied by the driver, a status of an escalation and lockout system configured to disable the hands-on lane centering assistance mode based on preprogramed criteria, and automatically transition between the operational modes without initiation by the driver based on a comparison of the data to preprogramed engagement conditions of the hands-on lane centering assistance mode.

In various embodiments, the controller is configured to, by the processor, automatically transition into a lane departure warning mode without initiation by the driver, wherein the lane departure warning mode is configured to generate a warning in response to determining that the vehicle is likely to unintentionally exit the lane of the road.

In various embodiments, the controller is configured to, by the processor, automatically transition between the hands-on lane centering assistance mode and a lane keep assist mode without initiation by the driver, wherein the lane keep assist mode is configured to intermittently control, while active, the lateral steering of the vehicle to reduce a likelihood of the vehicle unintentionally exiting the lane of the road.

In various embodiments, the controller is configured to, by the processor: receive data including a speed of the vehicle, determine a cross over speed zone in which either of the hands-on lane centering assistance mode and the lane keep assist mode may be active and in control of the lateral steering of the vehicle, and a hysteresis speed zone in which both the hands-on lane centering assistance mode and the lane keep assist mode may be active while only one is in control of the lateral steering of the vehicle, and automatically transition between the hands-on lane centering assistance mode and the lane keep assist mode using the cross over speed zone and the hysteresis speed zone to promote a smooth transition therebetween.

In various embodiments, the controller is configured to, by the processor: determine that an adaptive cruise control system of the vehicle configured to control a speed of the vehicle is active, wherein the adaptive cruise control system is configured to maintain the speed of the vehicle at a set speed, receive data that includes a speed of the vehicle, and automatically deactivate the hands-on lane centering assistance mode when the speed of the vehicle exceeds the set speed by a difference in excess of an adaptive cruise control threshold.

In various embodiments, the controller is configured to, by the processor: receive data including a torque of the vehicle applied by the driver, and automatically activate a collaborative steering submode of the hands-on lane centering assistance mode without initiation by the driver in response to detecting the torque applied by the driver, wherein while the collaborative steering submode is active the lateral steering of the vehicle is simultaneously controlled by both the hands-on lane centering assistance mode and the driver.

In various embodiments, the controller is configured to, by the processor: receive data including a detection of an obstacle on a lateral side of the vehicle and distances of the vehicle from markings of the lane of the road, and automatically control the lateral steering of the vehicle with the hands-on lane centering assistance mode in response to the driver ceasing application of a torque of the vehicle or in response to the detection of the obstacle on the lateral side of the vehicle.

In various embodiments, the controller is configured to, by the processor, automatically transition between the operational modes of the vehicle without initiation by the driver based on a single software algorithm.

A method is provided for managing transitions between operational modes of a vehicle. In one embodiment, the method includes automatically transitioning, with a processor, between multiple operational modes of a vehicle without initiation by a driver of the vehicle, the operational modes including a hands-off autonomous driving mode in which a processor controls lateral steering of the vehicle while a driver of the vehicle is not required to hold a steering wheel of the vehicle, a hands-on driving assistance mode in which the processor controls the lateral steering of the vehicle while the driver is required to hold the steering wheel of the vehicle, and a no control mode in which the driver of the vehicle controls the lateral steering of the vehicle. Automatically transitioning between the operational modes of the vehicle is based on sensed driver activity and vehicle dynamics. The hands-off autonomous driving mode is prioritized over the at least one hands-on driving assistance mode and the hands-on driving assistance mode is prioritized over the no control mode. The method further includes displaying, with the processor, on a human-machine-interface of the vehicle a notification indicating that at least one of the operational modes is active or not available.

In various embodiments, the method includes, by the processor, operating the vehicle in the hands-on autonomous driving mode including automatically activating a hands-on lane centering assistance mode without initiation by the driver, wherein the hands-on lance centering assistance mode is configured to control, while active, the lateral steering of the vehicle to direct the vehicle toward a center of a lane of a road on which the vehicle is traveling.

In various embodiments, the method includes, by the processor: receiving data that includes a status of an adaptive cruise control system of the vehicle configured to control a speed of the vehicle, an acceleration of the vehicle, a torque of the vehicle applied by the driver, a status of an escalation and lockout system configured to disable the hands-on lane centering assistance mode based on preprogramed criteria, and wherein automatically transitioning between the operational modes without initiation by the driver includes comparing the data to preprogramed conditions of the hands-on lane centering assistance mode.

In various embodiments, the method includes, by the processor, automatically transitioning the vehicle into a lane departure warning mode without initiation by the driver, wherein the lane departure warning mode is configured to generate a warning in response to determining that the vehicle is likely to unintentionally exit the lane of the road.

In various embodiments, the method includes, by the processor, automatically transitioning between the hands-on lane centering assistance mode and a lane keep assist mode without initiation by the driver, wherein the lane keep assist mode is configured to intermittently control, while active, the lateral steering of the vehicle to reduce a likelihood of the vehicle unintentionally exiting the lane of the road.

In various embodiments, the method includes, by the processor: receiving data that includes a speed of the vehicle, determining a cross over speed zone in which either of the hands-on lane centering assistance mode and the lane keep mode may be active and in control of the lateral steering of the vehicle and a hysteresis speed zone in which both the hands-on lane centering assistance mode and the lane keep assist mode may be active while only one is in control of the lateral steering of the vehicle, and automatically transitioning between the hands-on lane centering assistance mode and the lane keep assist mode using the cross over speed zone and the hysteresis speed zone to promote a smooth transition therebetween.

In various embodiments, the method includes, by the processor: determining that an adaptive cruise control system of the vehicle configured to control a speed of the vehicle is active, wherein the adaptive cruise control system is configured to maintain the speed of the vehicle at a set speed, receiving data that includes a speed of the vehicle, and deactivating the hands-on lane centering assistance mode when the speed of the vehicle exceeds the set speed by a difference in excess of an adaptive cruise control threshold.

In various embodiments, the method includes, by the processor: receiving data that includes a torque of the vehicle applied by the driver, and automatically activating a collaborative steering submode of the hands-on lane centering assistance mode without initiation by the driver in response to detecting the torque applied by the driver, wherein while the collaborative steering submode is active the lateral steering of the vehicle is simultaneously controlled by both the hands-on lane centering assistance mode and the driver.

In various embodiments, the method includes, by the processor: receiving data that includes a detection of an obstacle on a lateral side of the vehicle and distances from markings of the lane of the road, and automatically controlling the lateral steering of the vehicle with the hands-on lane centering assistance mode in response to the driver ceasing application of the torque or in response to the detection of the obstacle on the lateral side of the vehicle.

In various embodiments, the automatically transitioning, by the processor, between the operational modes of the vehicle without initiation by the driver is performed based on a single software algorithm.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
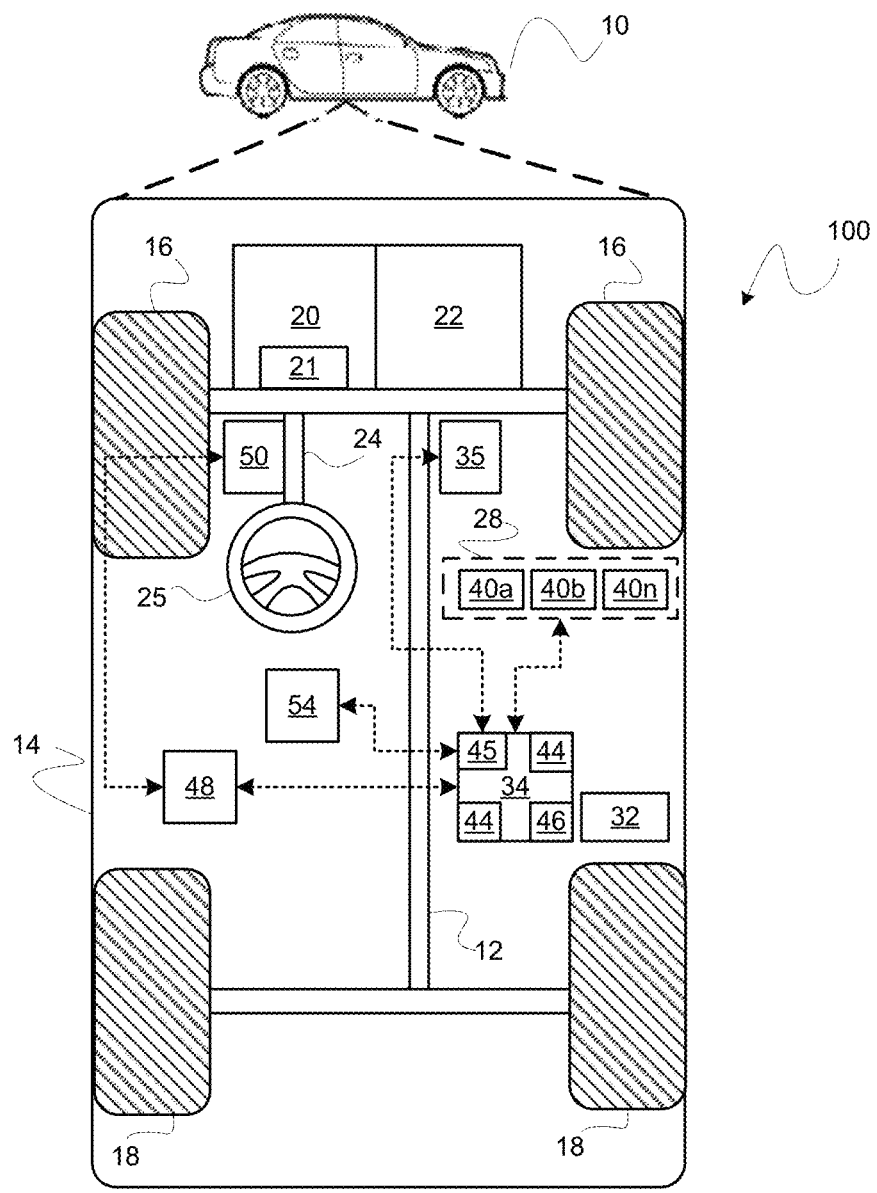
FIG. 1 is a functional block diagram of a vehicle that includes an advanced driving assistance system, in accordance with various embodiments.

FIG. 1 illustrates a vehicle 10, according to an exemplary embodiment. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, a sensor system 28, at least one data storage device 32, at least one controller 34, a display system 35, a driver monitoring system (DMS) 48, and an adaptive cruise control system (ACC) 54. The propulsion system 20 includes a motor 21, such as an internal combustion engine (gasoline or diesel fueled), an electric motor, or other fuel burning engine. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The steering system 24 influences a position of the wheels 16-18 and includes a steering wheel 25 for manual steering of the vehicle 10 by a driver of the vehicle 10.

The sensor system 28 includes one or more sensing devices 40a-40n that sense observable conditions of the exterior and/or interior environment of the vehicle 10 and/or of the vehicle 10 itself. The sensing devices 40a-40n can include, but are not limited to, radar systems, lidar systems, global positioning systems, optical camera systems, thermal camera systems, ultrasonic sensor systems, inertial measurement units, pressure sensor systems, position sensor systems, speed sensor systems, and/or other sensors and systems thereof.

The display system 35 may include any type of display device capable of visually indicating information to the driver. In various embodiments, the display system 35 may include a dashboard of the vehicle 10 that includes one or more illuminating icons or lights. In various embodiments, the display system 35 may include a display screen configured to render visual graphics thereon.

The DMS 48 may include various controllers, memory devices, data storage devices, sensors, etc. that in combination are configured to monitor the driver of the vehicle 10 and continuously or periodically generate an assessment of the attentiveness of the driver during operation of the vehicle 10. In this example, the DMS 48 includes a camera 50 configured to observe the driver, for example, the driver's face. Such observations are used by the DMS 48, at least in part, for generating the assessment of the driver, referred to herein as an attention state of the driver.

The ACC 54 may include various controllers, memory devices, data storage devices, sensors, etc. that in combination are configured to maintain the vehicle 10 at the set speed without the driver applying pressure to an acceleration pedal of the vehicle 10. The ACC 54 may be manually activated by the driver, including manually setting the set speed. The ACC 54 may include an overdrive mode in which the driver applies pressure to the acceleration pedal to increase the speed of the vehicle above the set speed. In the overdrive mode, the ACC 54 may be set to a standby mode, thereby allowing the driver to control acceleration of the vehicle 10, until the driver ceases application of the pressure to the acceleration pedal. Once the driver ceases manual acceleration of the vehicle 10, the ACC 54 may automatically re-engage and continue to maintain the vehicle 10 at the set speed.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The data storage device 32 can be any suitable type of storage apparatus, including various different types of direct access storage and/or other memory devices. In one exemplary embodiment, the data storage device 32 comprises a program product from which a computer readable memory device can receive a program that executes one or more embodiments of one or more processes of the present disclosure, such as the steps of the process discussed further below in connection with FIGS. 3A-3C and 4. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate data.

In various embodiments, the instructions, when executed by the processor 44, generally process received data in order to determine decisions relating to transitions between operational modes of the vehicle 10 as further described with respect to the FIGS. 2-9. As such, the vehicle 10 includes an advanced driving assistance system 100 configured to manage two or more operational modes of the vehicle 10 configured to provide driving assistance to the driver. In various embodiments, the advanced driving assistance system 100 may include any combination of the controller 34, the DMS 48, the ACC 54, other systems of the vehicle 10, and/or an entirety of the vehicle 10.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

The controller 34 is configured to transition the vehicle 10 between multiple automated driving operational modes and, optionally, operate the vehicle 10 in the operational modes. The operational modes are configured to provide driving assistance to the driver, such as continuous autonomous, continuous semi-autonomous, and/or intermittent intervention driving assistance. In the examples described herein, the operational modes include a hands-off autonomous driving mode, a hands-on lane centering assistance mode, a lane keep assist mode, and a no control mode; however, the system 100 may include fewer or more operational modes, including operational modes not described herein.

The hands-off autonomous driving mode may be manually or automatically (i.e., without driver initiation) activated to provide various types of driving assistance while the driver is not holding the steering wheel 25. In various embodiments, the hands-off autonomous driving mode may provide continuous autonomous driving assistance. The hands-on lane centering assistance mode may be manually or automatically activated and configured to autonomously steer the vehicle 10 towards a center of a lane of the road in which the vehicle 10 is traveling. In various embodiments, the hands-on lane centering assistance mode may be capable of operating in a collaborative steering mode/submode wherein both the driver and the controller 34 have simultaneous control of the steering of the vehicle 10 and/or aspects thereof. The lane keep assist mode is configured to intermittently steer the vehicle 10 toward the center of the lane of the road to avoid unintentionally exiting the lane. The no control mode does not provide any steering assistance such that the driver is solely responsible for steering the vehicle 10. Nonlimiting examples of systems capable of performing the hands-off autonomous driving mode, the hands-on lane centering assistance mode, and the lane keep assist mode are described in U.S. Pat. No. 11,299,179 B2 to Zarringhalam et al., the entirety of which is incorporated herein by reference.

In addition to the above, the multiple operational modes may include a lane departure warning mode. The lane departure mode may monitor sensed information relating to lanes of the road and the operating dynamics of the vehicle 10 to determine whether the vehicle 10 will, under the current operating conditions, unintentionally exit the lane of the road in which the vehicle 10 is traveling. Upon determining that the vehicle 10 is likely to unintentionally exit the lane of the road in which the vehicle 10 is traveling, a warning may be generated to alert the driver.

Figure 2:
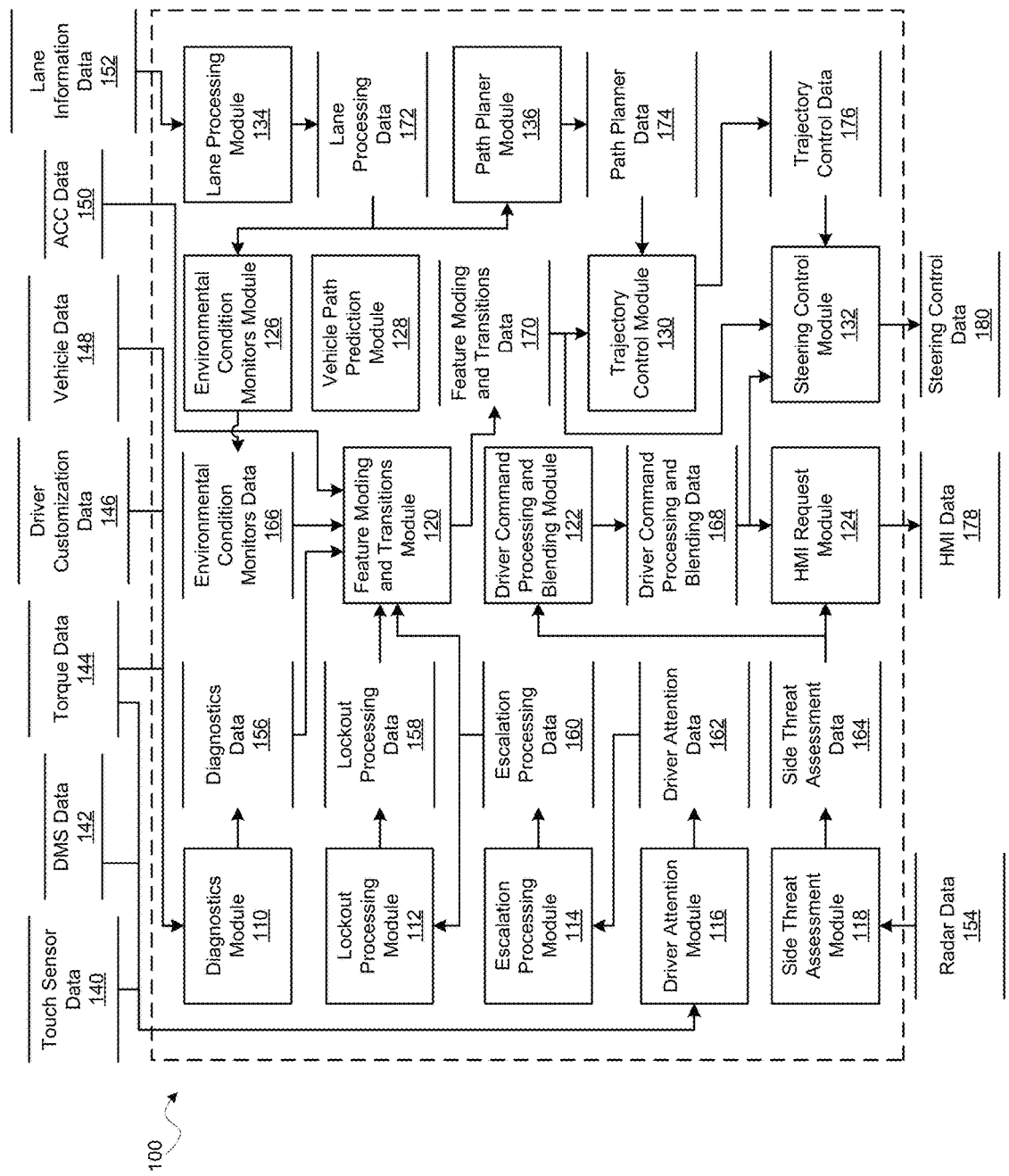
FIG. 2 is a dataflow diagram illustrating elements of the advanced driving assistance system of the vehicle of FIG. 1, in accordance with various embodiments.

With reference to FIG. 2 and with continued reference to FIG. 1, a dataflow diagram illustrates elements of the advanced driving assistance system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from other control modules (not shown) associated with the vehicle 10, and/or determined/modeled by other sub-modules (not shown) within the controller 34.

Furthermore, the inputs might also be subjected to preprocessing, such as sub-sampling, noise-reduction, normalization, feature-extraction, missing data reduction, and the like. In various embodiments, the system 100 includes a diagnostics module 110, a lockout processing module 112, an escalation processing module 114, a driver attention module 116, a side threat assessment module 118, a feature moding and transitions module 120, a driver command processing and blending module 122, a human-to-interface (HMI) request module 124, an environmental condition monitors module 126, a vehicle path prediction module 128, a trajectory control module 130, a steering control module 132, a lane processing module 134, and a path planner module 136.

In various embodiments, the diagnostics module 110 receives as input torque data 144 and vehicle data 148 generated by the sensor system 28, and driver customization data 146 input by the driver and saved, for example, in the data storage device 32. The torque data 144 includes various data indicating information relating to torque applied by the driver of the vehicle 10 and the vehicle data 148 includes various data indicating information relating to the operating dynamics of the vehicle 10 (e.g., speed, acceleration, etc.). The driver customization data 146 includes various data indicating preprogramed preferences of the driver.

The diagnostics module 110 performs an assessment of the operating conditions of the vehicle 10 and its various systems and the driver's preferences. The diagnostics module 110 generates diagnostics data 156 based on the received data.

In various embodiments, the driver attention module 116 receives as input touch sensor data 140, the torque data 144, and DMS data 142. The touch sensor data 140 includes various data indicating the position of the driver's hands on the steering wheel 25 generated by the touch sensors of the sensor system 28. The DMS data 142 includes various data indicating observations of the driver's activities, and may optionally include attention states of the driver.

The driver attention module 116 performs an analysis of the received data which may consider, for example, data related to the hand position of the driver on the steering wheel 25, the attention state of the driver, etc. to determine an attention state of the driver. The driver attention module 116 generates driver attention data 162 that includes the determined attention state of the driver.

In various embodiments, the escalation processing module 114 receives as input the driver attention data 162 generated by the driver attention module 116. The escalation processing module 114 performs a comparison of the driver's attention state to conditions related to the various operational modes of the vehicle 10. Upon a determination by the escalation processing module 114 that the driver's attention state does not satisfy the conditions of one or more of the operational modes, the escalation processing module 114 may determine and initiate a predetermined action, such as generating an alert to the driver to pay attention, taking control of the steering of the vehicle 10, generating haptic seat feedback, and/or changing elements of the HMI (e.g., color change, display icon, etc.). The escalation processing module 114 generates escalation processing data 160 that includes various data indicating escalation information.

In various embodiments, the lockout processing module 112 receives as input the escalation processing data 160. The lockout processing module 112 performs an assessment of the received data to determine whether to lockout one or more of the operational modes of the vehicle 10. As used herein, the term lockout refers to a setting in which the driver is prevented from using and/or engaging one or more operational modes for a predetermined amount of time. The predetermined amount of time may vary based on factors such as how many times the operational mode has been locked out previously. For example, a first time lockout may last for one minute, a second time lockout may last for two minutes, and a third time lockout and beyond may last for a whole keycycle (i.e., until the vehicle 10 is shut off). The lockout may be initiated, for example, for safety and compliance of the driver. The lockout processing module 112 generates lockout processing data 158 that includes various data indicating whether the one or more operational modes are or should be locked out.

In various embodiments, the side threat assessment module 118 receives as input radar data 154 generated by a radar of the sensor system 28. The radar data 154 includes various data indicating detections of obstacles adjacent to the vehicle 10, such as on lateral sides of the vehicle 10.

The side threat assessment module 118 performs an analysis of the radar data 154 to determine whether the vehicle 10 will, under the current operating conditions, approach an obstacle in an unsafe manner (e.g., change lanes and potentially collide with an adjacent vehicle). The side threat assessment module 118 generates side threat assessment data 164 that includes various data indicating a determination of whether there is an obstacle-related threat to the vehicle 10 and, if so, a location of such obstacle.

In various embodiments, the lane processing module 134 receives as input lane information data 152 generated by a lane sensing device of the sensor system 28. The lane information data 152 includes various data indicating information related to lanes of the road (e.g., markings, etc.).

The lane processing module 134 performs an analysis of the lane information data 152 to determine a position of the vehicle 10 on the road and distances between the vehicle 10 and edges of the lane. The lane processing module 134 generates lane processing data 172 that includes various data related to the lane of the road and the position of the vehicle 10 on the road.

In various embodiments, the environmental condition monitors module 126 receives as input the lane processing data 172. The environmental condition monitors module 126 performs an analysis of the received data and monitors for proper operation of semi-autonomous systems of the vehicle 10. For example, this may include determining whether lines/markings on the lane are sufficiently visible, determining a level of confidence in the lines/markings on the lane (e.g., high or low), determining whether a width of the lane is within an acceptable range, determining whether a curvature of the lane is within an acceptable range for the vehicle 10 to reliably track a center of the lane, determining whether there are sudden changes in the position of the vehicle 10 within the lane, the heading of the vehicle 10, the curvature of the lane, etc. If conditions such as these are not met, the currently running operational mode may disengage.

In various embodiments, the feature moding and transitions module 120 receives as input the diagnostics data 156 generated by the diagnostics module 110, the lockout processing data 158 generated by the lockout processing module 112, the escalation processing data 160 generated by the escalation processing module 114, adaptive cruise control (ACC) data 150 generated by the ACC 54, and the environmental conditions monitors data 166 generated by the environmental condition monitors module 126. The ACC data 150 includes various data indicating a status of the ACC 54 (e.g., active/inactive) and a set speed thereof.

The feature moding and transitions module 120 performs an analysis of the received data and makes decisions related to transitions between the various operational modes of the vehicle 10. Exemplary decisions and actions performed by the feature moding and transitions module 120 are represented in the flowcharts of FIGS. 3A-3D and FIG. 4. The feature moding and transitions module 120 generates feature moding and transitions data 170 that includes various data indicating a determination relating to whether to transition between the operational modes.

In various embodiments, the driver command processing and blending module 122 receives as input the side threat assessment data 164. The driver command processing and blending module 122 performs an analysis of the side threat assessment data 164, and in response to a side threat being detected, reduces any collaborative steering that provides for the driver's control of the vehicle 10 such that the vehicle 10 is automatically steered toward the center of the lane. The driver command processing and blending module 122 generates driver command processing and blending data 168 including various data indicating instructions relating to notifications, alerts, etc. to be generated for the driver. For example, the driver command processing and blending data 168 may include instructions to display an icon on the HMI and/or display an indicator on mirrors of the vehicle.

In various embodiments, the human-to-interface (HMI) request module 124 receives as input the side threat assessment data 164 generated by the side threat assessment module 118 and the driver command processing and blending data 168 generated by the driver command processing and blending module 122. The human-to-interface (HMI) request module 124 performs an analysis of the received data and prepares instructions for any desired alerts and/or notifications to the driver. For example, the HMI requests module 124 may generate instructions to notify the driver that one or more of the operational modes are unavailable or active. As another example, the HMI requests module 124 may generate instructions to alert the driver of an obstacle adjacent the vehicle 10 that posed a threat to the vehicle 10.

In various embodiments, the vehicle path prediction module 128 receives as input vehicle dynamics data that may include one or more of the touch sensor data 140, the DMS data 142, the torque data 1444, the vehicle data 148, the ACC data 150, and/or other data sensed by, for example, the sensor system 28 (e.g., data Inertial Measurement Units (IMUs), GPS, vehicle speed, steering angle sensor, wheel speeds, etc.)

The vehicle path prediction module 128 performs and analysis of the vehicle dynamics data and predicts a path that the vehicle 10 will travel. This predicted path is compared with a desired trajectory and steering correction is made to reduce the tracking error, that is, the difference between the predicted path and the desired trajectory.

In various embodiments, the path planner module 136 receives as input the lane processing data 172 generated by the lane processing module 134. The path planner module 136 performs an analysis of the received data and determines a path of travel for the vehicle 10 on the road. The path planner module 136 generates path planner data 174 that includes various data indicating the determined path for the vehicle 10.

In various embodiments, the trajectory control module 130 receives as input the feature moding and transitions data 170 generated by the feature moding and transitions module 120 and the path planner data 174 generated by the path planner module 136. The trajectory control module 130 performs an analysis of the received data and creates a desired road wheel angle for the vehicle 10 to track the desired trajectory as specified by path planner module 136. This desired road wheel angle may be converted to a steering wheel torque and/or a steering wheel angle. The trajectory control module 130 generates trajectory control data 176 that includes various data indicating the desired road wheel angle and/or the steering wheel angle.

In various embodiments, the steering control module 132 receives as input the feature moding and transitions data 170 generated by the feature moding and transitions module 120, the driver command processing and blending data 168 generated by the driver command processing and blending module 122, and the trajectory control data 176 generated by the trajectory control module 130. The steering control module 132 performs an analysis of the received data and prepares instructions for any desired steering control of the vehicle 10. For example, the steering control module 132 may generate instructions to override driver applied torque and steer the vehicle 10 away from an obstacle.

With reference now to FIGS. 3A, 3B, 3C, and 3D and with continued reference to FIGS. 1-2, a flowchart provides a method 200 (for clarity, split into methods 200A-200D) for transitioning between operational modes of the vehicle 10 as performed by the advanced driving assistance system 100, in accordance with exemplary embodiments.

In one example, the method 200 may begin, at 210, with a determination as to whether the vehicle 10 includes a hands-off autonomous driving mode. If a hands-off autonomous driving mode is included, the method 200 includes determining, at 212, whether preprogramed conditions are met for automatic engagement of the hands-off autonomous driving mode, and if so, whether input conditions to enable the hands-off autonomous driving mode are met at 214. Nonlimiting examples of the preprogramed conditions include determining that there have been no faults in the sensors and actuators, that the vehicle 10 is within the operational domain of the hands-off autonomous driving mode (e.g., on a mapped road), etc. Nonlimiting examples of the input conditions include determining that lane data is valid, that the vehicle 10 is between the lines/markings or the lane, that the speed and lateral acceleration the vehicle 10 are within specific thresholds, etc. If either of these sets of conditions are not met, the method 200 includes a determination, at 216, as to whether the driver requested enablement of the hands-off autonomous driving mode, and if so, whether input conditions to enable the hands-off autonomous driving mode are met at 218.

In response to a determination that the hands-off autonomous driving mode conditions are met at 214 or 218, the method 200 includes adjusting torque safety criteria at 220, activating hands-off control calibrations at 222 (e.g., maintaining magnitude and rate of change of the torque command within specific thresholds), setting a corresponding controller in a centering mode and then activating such controller at 224, and operating the vehicle 10 in the hands-off autonomous driving mode while reporting torque and transition status at 226. In response to a determination that the hands-off autonomous driving mode conditions are not met at 218, a notification is generated, at 228, to inform the driver that the hands-off autonomous driving mode is unavailable.

Figure 3A:
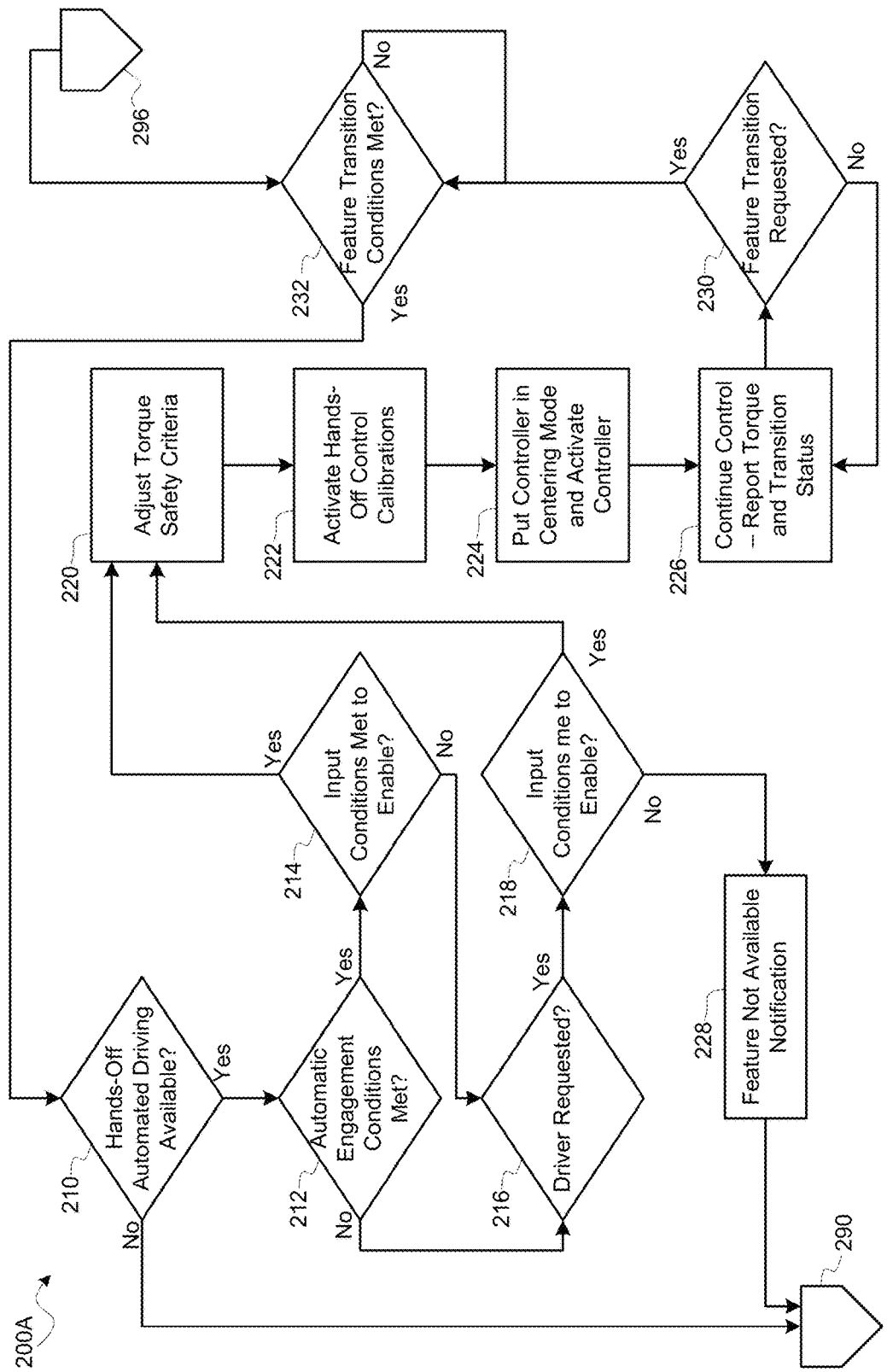
FIGS. 3A, 3B, 3C, and 3D are flowcharts of a process for managing transitions between multiple operational modes of the vehicle as performed by the advanced driving assistance system of the vehicle of FIGS. 1 and 2, in accordance with various embodiments.
Figure 3B:
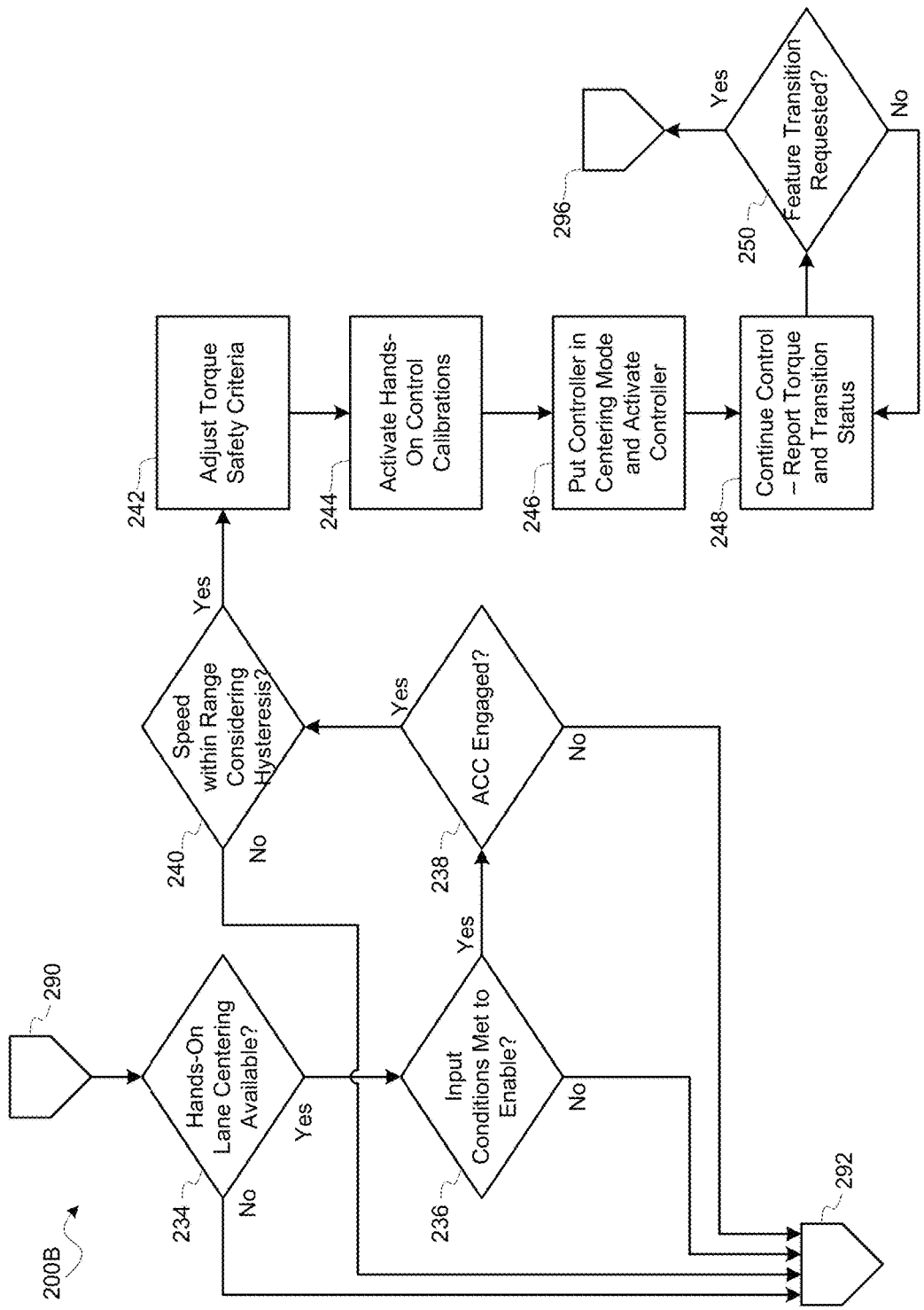

If the vehicle 10 does not include a hands-off driving assistance mode (determined at 210), or subsequent to generating the notification that such mode is unavailable at 228, the method 200 continues to FIG. 3B via the off-page reference 290.

Referring now to FIG. 3B, the method 200 includes determining, at 234, whether the vehicle 10 includes a hands-on lane centering assistance mode. If a hands-on lane centering assistance mode is included, the method 200 includes determining, at 236, whether input conditions required to enable the hands-on lane centering assistance mode are met. For example, the determination may include determining whether any systems associated with the hands-on lane centering assistance mode have reported errors or failures, whether the driver's hands are on the steering wheel 25, whether the touch sensor data is valid, whether the lane data is valid, whether the vehicle 10 is between the lines of the lane, whether the speed and lateral acceleration of the vehicle 10 are within specific thresholds, etc.

In response to a determination that the hands-on lane centering assistance mode input conditions are met at 236, the method 200 includes a determination as to whether the ACC 54 is active at 238. If the ACC 54 is active, the method 200 includes a determination, at 240, as to whether the vehicle 10 is traveling within a speed range of the hands-on lane centering assistance mode. In various embodiments, this determination includes consideration of a hysteresis zone (described below).

Upon a determination that the speed of the vehicle 10 is within the hands-on lane centering assistance mode speed range, the method 200 includes adjusting torque safety criteria at 242, activating hands-on control calibrations at 244 (e.g., setting the torque magnitude and rate to appropriate calibration values, setting hands-on control gains (position and/or heading gains) to appropriate calibration values, etc.), setting a corresponding controller in a centering mode and then activating such controller at 246, and operating the vehicle 10 in the hands-on lane centering assistance mode while reporting torque and transition status at 248.

Figure 3C:
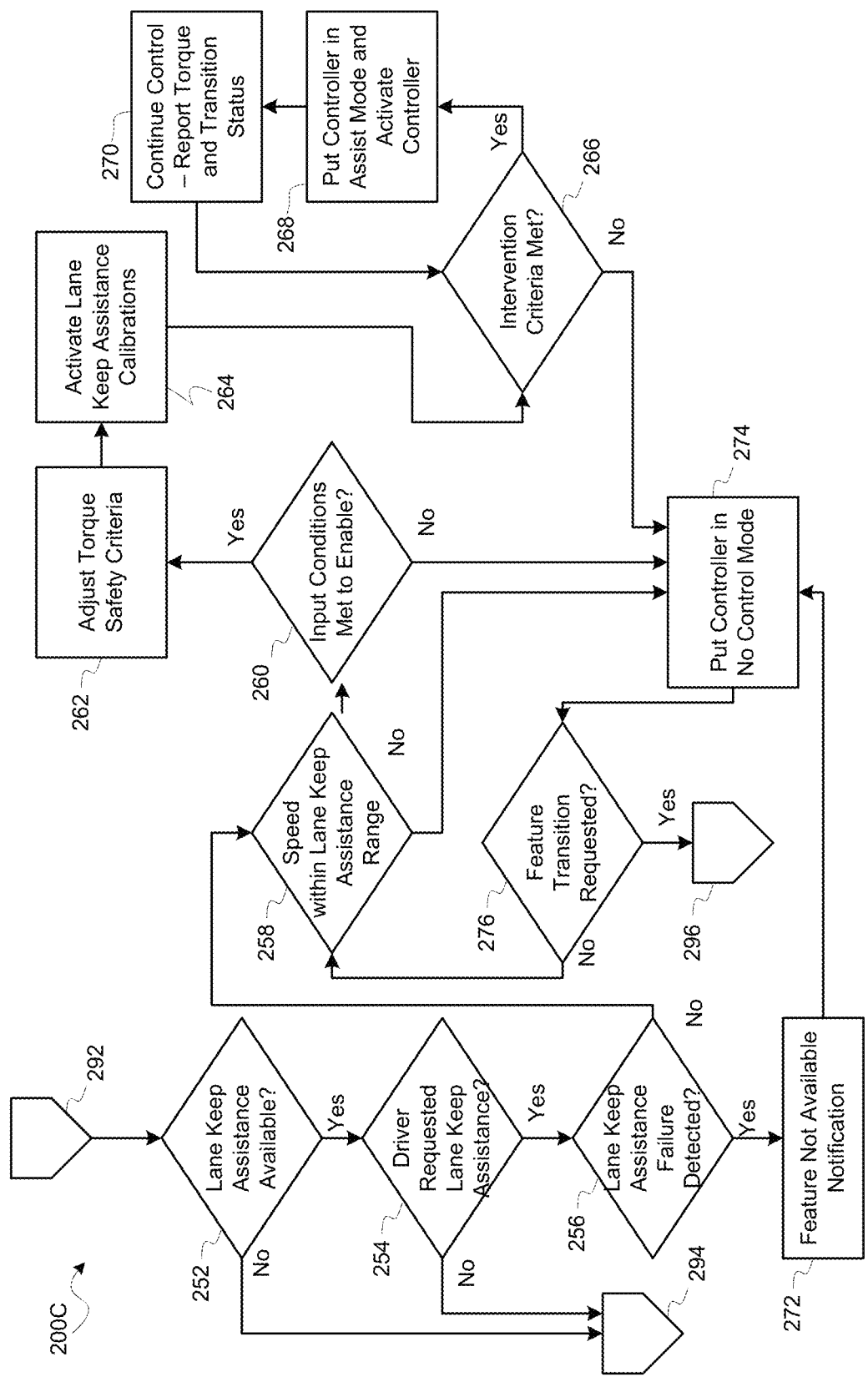

If the vehicle 10 does not include a hands-on lane centering assistance mode (determined at 234), subsequent to a determination that the input conditions of the hands-on lane centering assistance mode are not met (at 236) or the ACC 54 is not active (at 238), the method 200 continues to FIG. 3C via the off-page reference 292.

Referring now to FIG. 3C, the method 200 includes a determination as to whether the vehicle 10 includes a lane keep assist mode at 252. If the vehicle 10 does include a lane keep assist mode, the method 200 includes a determination as to whether the driver requested enablement of the lane keep assist mode at 254. Upon a determination that the driver requested enablement of the lane keep assist mode, method 200 includes a determination as to whether any systems associated with the lane keep assist mode have experienced any errors or failures at 256. If no errors or failures have been detected or reported, the method 200 includes a determination as to whether the vehicle 10 is traveling within a speed range of the lane keep assist mode at 258.

Upon a determination that the speed of the vehicle 10 is within the lane keep assist mode speed range, the method 200 includes a determination as to whether input conditions required to enable the lane keep assist mode are met at 260. Nonlimiting examples of the input conditions may include determining whether at least one line/marking of the lane is detected by the sensors, that the curvature of the lane is within a threshold, etc. Upon a determination that the input conditions of the lane keep assist mode are met, the method 200 includes adjusting torque safety criteria at 262, and activating hands-on control calibrations at 264 (e.g., setting the torque magnitude and rate to appropriate calibration values, setting hands-on control gains (position and/or heading gains) to appropriate calibration values, etc.).

The method continues with a determination as to whether intervention criteria of the lane keep assist mode are satisfied at 266. The intervention criteria may include, for example, a determination based on sensed information that the vehicle 10 is likely to exit the lane in which the vehicle 10 is traveling, and that the lane exit is unintentional (e.g., driver is not turning the steering wheel 25, the turn signal is not active, etc.). If the intervention criteria are met, the method 200 includes setting a corresponding controller in an assist mode and then activating such controller at 268, and operating the vehicle 10 in the lane keep assist mode while reporting torque and transition status at 270.

If an error or failure is detected or reported at 256, the speed of the vehicle 10 is not within the lane keep assist mode speed range at 258, the input conditions of the lane keep assist mode are not met at 260, or the intervention criteria are not met at 266, the method 200 includes operating the vehicle 10 in a no control mode, at 274, that does not include driving assistance, that is, the steering is exclusively controlled by the driver. If an error or failure is detected or reported at 256, the method 200 includes generating a notification, at 272, to inform the driver that the lane keep assist mode is not available.

Figure 3D:
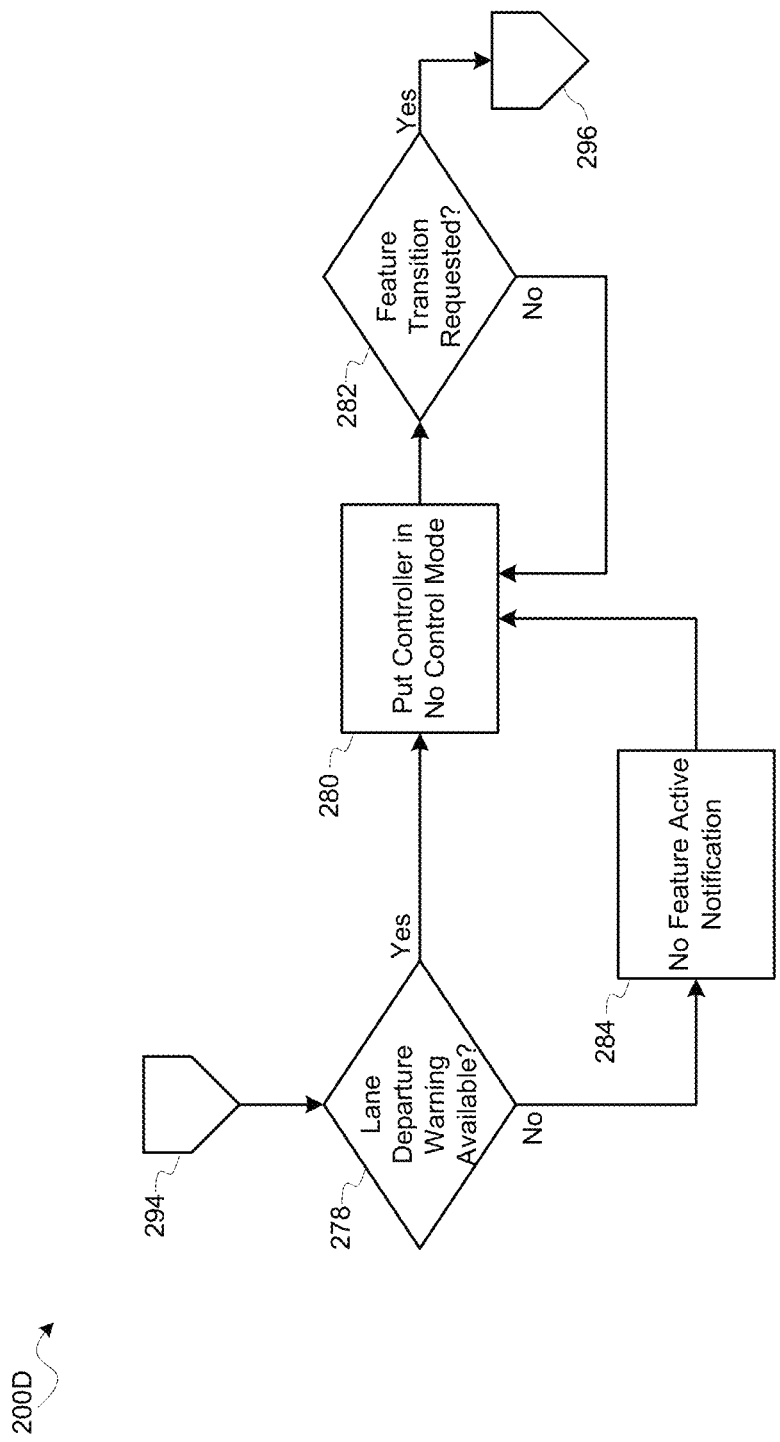

If the vehicle 10 does not include the lane keep assist mode (determined at 252), or subsequent to a determination that the driver did not request enablement of the lane keep assist mode (at 254), the method 200 continues to FIG. 3D via the off-page reference 294.

Referring now to FIG. 3D, the method 200 includes a determination as to whether the vehicle 10 includes a lane departure warning mode at 278. If the vehicle 10 does include the lane departure warning mode, the method 200 includes operating the vehicle 10 in the no control mode at 280. If the vehicle 10 does not include the lane departure warning mode, the method 200 includes generating a notification that no driving assistance modes are active at 284 and then operating the vehicle 10 in the no control mode at 280.

While operating the vehicle 10 in any one of the operational modes, the method 200 includes continuously monitoring for requests for mode transitions at 230 (FIG. 3A), at 250 (FIG. 3B), at 276 (FIG. 3C), and at 282 (FIG. 3D). If such request is received, the method 200 includes determining, at 232 (FIG. 3A), whether preprogrammed conditions associated with such transition are met. The preprogrammed conditions may be specific to the currently active operational mode and/or the operational mode that is requested. For example, the preprogrammed conditions may include determining whether the driver has turned off the hands-off control mode (e.g., by pressing a corresponding button), or whether the vehicle 10 exits the operational domain of the operational mode. If a determination is made at 232 that the conditions are not met, the method 200 includes continuing to monitor for subsequent requests for mode transitions. However, if a determination is made at 232 that the conditions are met, the method 200 includes returning to 210 to continue the method 200.

As noted previously, one or more of the operational modes may include activation/engagement conditions that include a speed range to which the corresponding operational mode is limited. For example, the system 100 may be preprogrammed to transition or allow for transition from the lane centering assistance mode to the lane keep assist mode and vice versa at a specific speed. However, in some embodiments the system 100 may provide a cross over zone relative to the specific speed within which both of the lane centering assistance mode to the lane keep assist mode are potentially operational. Such embodiments may promote flexibility to accommodate various environmental conditions and operating conditions of the vehicle 10.

As a specific nonlimiting example, the system 100 may be configured to allow for operation of the hands-on lane centering assistance mode when the vehicle 10 is traveling at speeds up to 85 kph, above which the system 100 transitions to the lane keep assistance mode. In such example, the system 100 may further include a cross over zone between, for example, 45 kph and 85 kph in which the hands-on lane centering assistance mode is prioritized, but the lane keep assistance mode may be activated and operated if the hands-on lane centering assistance mode is unavailable.

Furthermore, the cross over zone may include hysteresis zones at the upper and/or lower limits thereof. For example, the system 100 may include hysteresis zones at 45 to 50 kph and 80 to 85 kph wherein both the hands-on lane centering assistance mode and the lane keep assistance mode are activated, but within which only the prioritized mode is actively controlling the vehicle 10. Such embodiments may promote a smooth transition between these operational modes.

Figure 4:
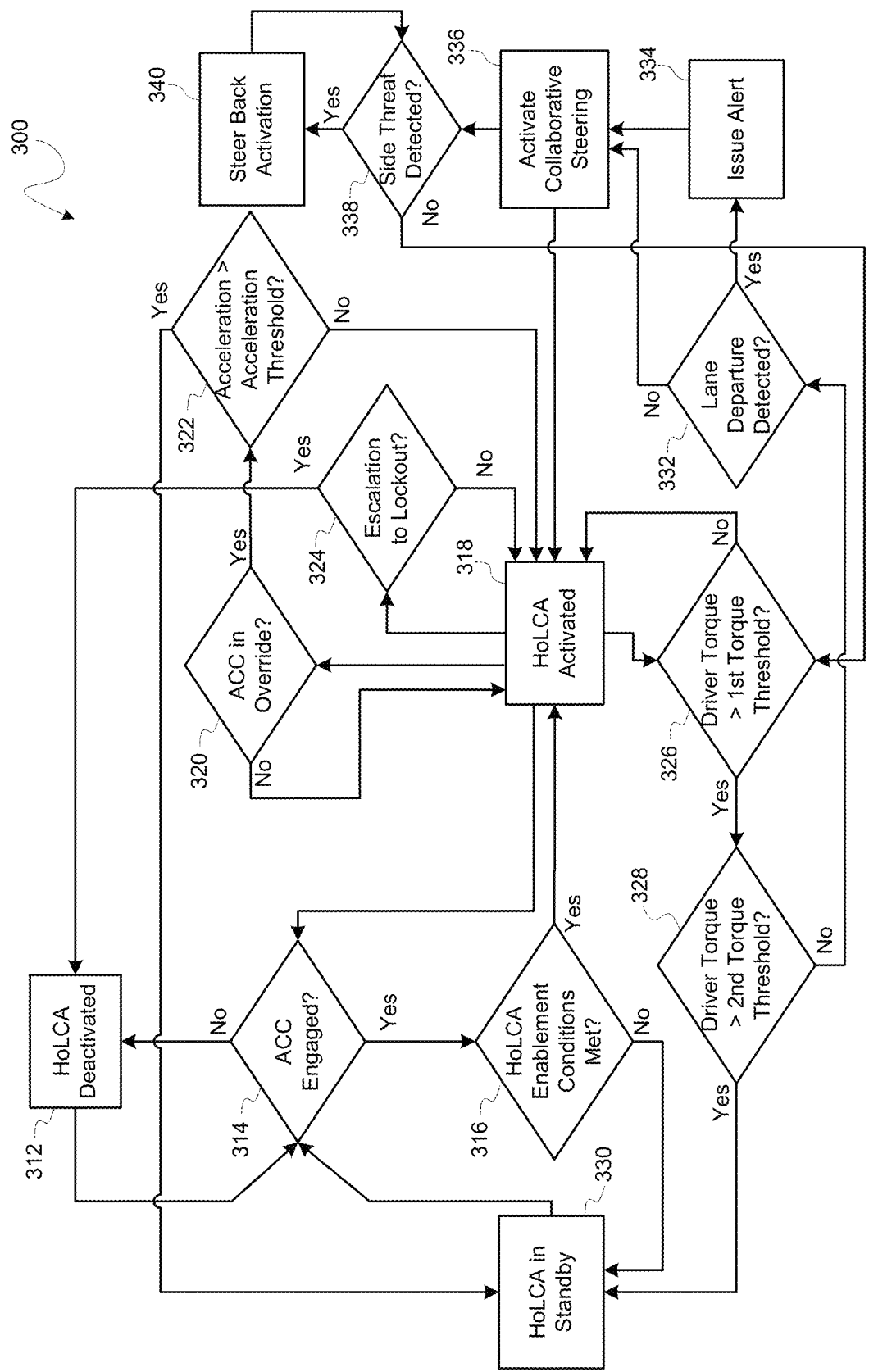
FIG. 4 is a flowchart of a process for managing automatic activation of a hands-on lane centering assistance mode of the vehicle of FIGS. 1 and 2, in accordance with various embodiments.

With reference now to FIG. 4 and with continued reference to FIGS. 1-3D, a flowchart provides a method 300 for automatically activating the hands-on lane centering assistance mode as performed by the advanced driving assistance system 100, in accordance with exemplary embodiments.

In one example, the method 300 may begin, at 312, with the hands-on lane centering assistance mode deactivated. While the hands-on lane centering assistance mode is deactivated, the method 300 may include continuously or periodically monitoring, at 314, for activation of the ACC 54. Once a determination is made that the ACC 54 is active, the method 300 includes determining, at 316, whether preprogramed conditions are met for activating the hands-on lane centering assistance mode. If the conditions are not met at 316, the method 300 includes placing the hands-on lane centering assistance mode in a standby mode at 330, and continuing to monitor the conditions for activation of the hands-on lane centering assistance mode until either the ACC 54 is deactivated or the conditions are met. In response to a determination that the conditions are met, the method 300 includes activating the hands-on lane centering assistance mode at 318.

Similarly, while the hands-on lane centering mode is active, the method 300 includes continuing to continuously or periodically monitor for any changes to the activation status of the ACC 54, at 314, and any changes that would cause the conditions for activating the hands-on lane change mode to no longer be met at 316. Upon a determination that the ACC 54 has been deactivated at 314, the method 300 includes deactivating the hands-on lane centering assistance mode at 312, and upon a determination that the conditions are no longer met, the method 300 includes placing the hands-on lane centering assistance mode in the standby mode, at 330, as previously described.

In addition, while the hands-on lane centering mode is active, the method 300 includes continuously or periodically monitoring for engagement of an override mode of the ACC 54 at 320, monitoring for escalation to a lockout feature of the hands-on lane centering assistance mode at 324, and monitoring for torque of the vehicle 10 applied in response to actions of the driver at 326.

If the override mode of the ACC 54 is engaged, that is, the driver is causing the vehicle 10 to operate at a speed in excess of the set speed of the ACC 54, the method 300 includes determining, at 322, whether the acceleration of the vehicle 10 exceeds an acceleration threshold. If a determination is made that the acceleration exceed the acceleration threshold, the method 300 includes placing the hands-on lane centering assistance mode in the standby mode at 330. If the acceleration does not exceed the acceleration threshold, the method 300 includes continuing to monitor the acceleration relative to the acceleration threshold until a determination is made that the override mode of the ACC 54 is no longer engaged. If preprogrammed conditions are met to cause escalation to the lockout feature at 324, the method 300 includes de-activating the hands-on lane centering assistance mode at 312.

While operating the vehicle 10 in with the ACC 54 active, the actual speed of the vehicle 10 may vary and oscillate about the set speed of the ACC 54, for example, due to changes in grade of the road. Therefore, in some embodiments, the method 300 may include accommodating for temporary cruise control overruns. That is, the hands-on lane centering assistance mode may only be placed in standby mode when the speed of the vehicle 10 exceeds the set speed of the ACC 54 by more than an ACC threshold (e.g., 1-8 kph). In such embodiments, the method 300 may include determining a reference speed for use in determining whether to place the hands-on lane centering assistance mode in the standby mode. As a specific nonlimiting example, the ACC 54 may have a set speed of 85 kph and the ACC threshold may be five kph. In this example, the reference speed may be the lesser of the speed of the vehicle 10 and the set speed of the ACC 54 as long as the speed of the vehicle 10 is temporarily traveling at no more than 90 kph, and the method 300 may only set the hands-on lane centering mode to standby when the speed of the vehicle 10 exceeds the reference speed.

If the driver's actions cause application of torque to the vehicle 10, the method 300 includes comparing the sensed torque to a first torque threshold at 326. If the torque does not exceed the first torque threshold, the method 300 includes continuing to monitor for subsequent torque resulting from the driver's actions. Upon a determination that the torque exceeds the first torque threshold at 326, the method 300 includes comparing the sensed torque to a second torque threshold at 328 that is greater than the first torque threshold. If the sensed torque exceeds the second torque threshold, the method 300 includes placing the hands-on lane centering assistance mode in the standby mode.

Upon a determination that the torque exceeds the first torque threshold at 326 but does not exceed the second torque threshold at 328, the method 300 includes determining, at 332, whether a lane departure is detected, that is, whether the driver applied torque will cause the vehicle 10 to exit a lane on the road. If no lane departure is detected, the method 300 includes activating the collaborative steering mode at 336. Upon a determination that the vehicle 10 will unintentionally exit the lane, the method 300 includes issuing an alert, at 334, to inform the driver that the applied torque will cause the vehicle 10 to unintentionally exit the lane, and then activating the collaborative steering mode at 336.

While the collaborative steering mode is active, the method 300 includes continuously or periodically checking for side threats at 338, that is, determining whether there are obstacles located on one or both lateral sides of the vehicle 10 and, if so, whether the applied torque will cause the vehicle 10 to approach and/or contact the obstacle(s). If a side threat is detected, the method 300 includes activating, at 340, a steer back feature of the collaborative steering mode wherein the collaborative steering mode overrides the driver's applied torque and steers the vehicle 10 toward the center of the lane (i.e., away from the obstacle).

Figure 6:
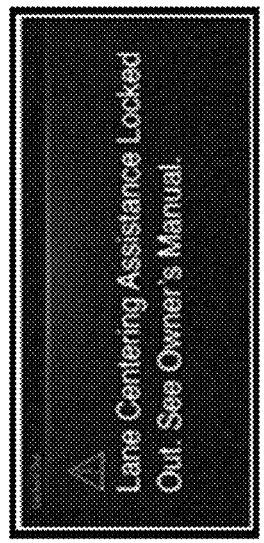
FIGS. 5, 6, 7, 8, and 9 represent exemplary human-to-machine interface icons displayed by the advanced driving assistance system of the vehicle of FIG. 1, in accordance with various embodiments.
Figure 7:
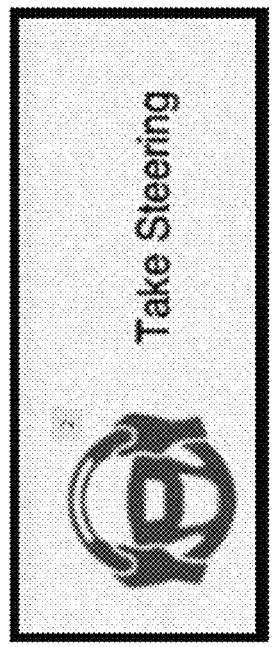
Figure 8:
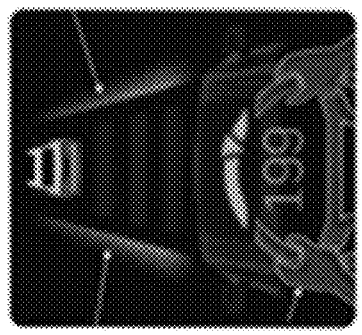
Figure 9:
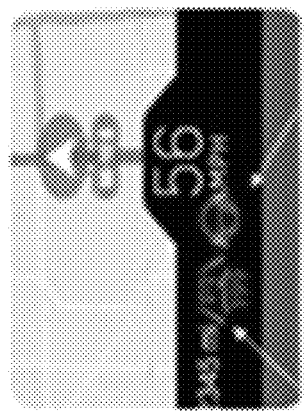
Figure 5:
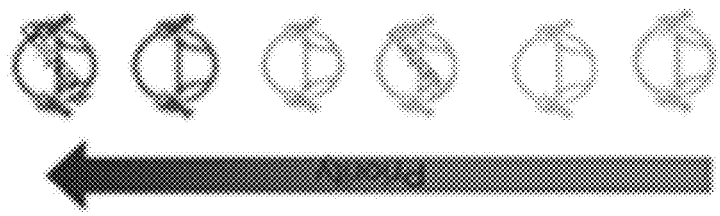

The system 100 may be configured to display various icons, symbols, textual messages, graphics, etc. to provide visual notifications and/or warning to the driver. FIGS. 5, 6, 7, 8, and 9 represent exemplary human-to-machine interface icons that may be displayed. FIG. 5 represents a series of icons that may be displayed to the driver to indicate instructions regarding the driver's hold on the steering wheel 25. The specific icon displayed will vary depending on the escalation of the DMS 48 (level of escalation represented by the "priority" arrow. For example, the icons may transition from a solid green icon, to a solid gray icon, to a flashing green icon, to a solid yellow icon, to a solid red icon, and to a flashing red icon. FIG. 6 represents an icon that indicates that the hands-on lane centering assistance mode is active. FIG. 7 represents a textual message that indicates that the hands-on lane centering assistance mode is currently locked out, for example, due to the driver failing to hold the steering wheel 25. FIG. 8 represents a display screen that includes a first icon indicating that the hands-on lane centering assistance mode is active, and a second icon indicating that the driver should maintain a hold on the steering wheel 25. FIG. 9 represents an icon and a textual message which instruct the driver to hold the steering wheel 25.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
    a controller configured to, by a processor:
        automatically transition a vehicle between multiple operational modes without initiation by a driver of the vehicle, the operational modes including a hands-off autonomous driving mode in which the processor controls lateral steering of the vehicle while the driver is not required to hold a steering wheel of the vehicle, a hands-on driving assistance mode in which the processor controls the lateral steering of the vehicle while the driver is required to hold the steering wheel, and a no control mode in which the driver controls the lateral steering of the vehicle with the steering wheel, wherein the automatic transition between the operational modes of the vehicle is based on sensed driver activity and vehicle dynamics, wherein the hands-off autonomous driving mode is prioritized over the hands-on driving assistance mode and the hands-on driving assistance mode is prioritized over the no control mode;
        display a first notification on a human-machine-interface of the vehicle in response to at least one of the operational modes being active; and
        display a second notification on the human-machine-interface of the vehicle in response to at least one of the operational modes being not available;
        operate the vehicle in the hands-on driving assistance mode by automatically activating a hands-on lane centering assistance mode without initiation by the driver, wherein the hands-on lane centering assistance mode is configured to control, while active, the lateral steering of the vehicle to direct the vehicle toward a center of a lane of a road on which the vehicle is traveling; and
        automatically transition into the no control mode and a lane departure warning mode without initiation by the driver in response to the hands-off autonomous driving mode and the hands-on driving assistance mode both being unavailable, wherein the lane departure warning mode is configured to generate a warning in response to determining that the vehicle is likely to unintentionally exit the lane of the road.

2. The system of claim 1, wherein the controller is configured to, by the processor, automatically transition between the hands-on lane centering assistance mode and a lane keep assist mode without initiation by the driver in response to the hands-off autonomous driving mode and the hands-on lane centering assistance mode both being unavailable, wherein the lane keep assist mode is configured to intermittently control, while active, the lateral steering of the vehicle to reduce a likelihood of the vehicle unintentionally exiting the lane of the road.

3. The system of claim 2, wherein the controller is configured to, by the processor:
    receive data including a speed of the vehicle;
    determine a cross over speed zone in which first conditions for engagement of the hands-on lane centering assistance mode are satisfied, second conditions for engagement of the lane keep assist mode are satisfied, and only one of the hands-on lane centering assistance mode and the lane keep assist mode are active and in control of the lateral steering of the vehicle, and a hysteresis speed zone in which both the hands-on lane centering assistance mode and the lane keep assist mode are active while only one is in control of the lateral steering of the vehicle; and
    automatically transition between the hands-on lane centering assistance mode and the lane keep assist mode using the cross over speed zone and the hysteresis speed zone.

4. The system of claim 1, wherein the controller is configured to, by the processor:
    determine that an adaptive cruise control (ACC) system of the vehicle configured to control a speed of the vehicle is active, wherein the adaptive cruise control system is configured to maintain the speed of the vehicle at a set speed;
    receive data that includes the speed of the vehicle; and automatically deactivate the hands-on lane centering assistance mode when the speed of the vehicle exceeds the set speed by an amount in excess of an ACC threshold.

5. The system of claim 1, wherein the controller is configured to, by the processor:
receive data including a torque of the vehicle applied by the driver; and
automatically activate a collaborative steering submode of the hands-on lane centering assistance mode without initiation by the driver in response to detecting that the torque applied by the driver is greater than a first torque threshold and less than a second torque threshold, and detecting that the vehicle is likely to unintentionally exit the lane of the road, wherein while the collaborative steering submode is active the lateral steering of the vehicle is simultaneously controlled by both the hands-on lane centering assistance mode and the driver to direct the vehicle toward the center of the lane of the road.

6. The system of claim 5, wherein the controller is configured to, by the processor:
receive data including a detection of an obstacle on a lateral side of the vehicle and distances of the vehicle from markings of the lane of the road; and
automatically control the lateral steering of the vehicle with the collaborative steering submode of the hands-on lane centering assistance mode in response to the detection of the obstacle on the lateral side of the vehicle to direct the vehicle away from the obstacle.

7. The system of claim 1, wherein the controller is configured to, by the processor, automatically transition between the operational modes of the vehicle without initiation by the driver based on a single software algorithm.

8. A system, comprising:
a controller configured to, by a processor:
automatically transition a vehicle between multiple operational modes without initiation by a driver of the vehicle, the operational modes including a hands-off autonomous driving mode in which the processor controls lateral steering of the vehicle while the driver is not required to hold a steering wheel of the vehicle, a hands-on driving assistance mode in which the processor controls the lateral steering of the vehicle while the driver is required to hold the steering wheel, and a no control mode in which the driver controls the lateral steering of the vehicle with the steering wheel, wherein the automatic transition between the operational modes of the vehicle is based on sensed driver activity and vehicle dynamics, wherein the hands-off autonomous driving mode is prioritized over the hands-on driving assistance mode and the hands-on driving assistance mode is prioritized over the no control mode;
display a first notification on a human-machine-interface of the vehicle in response to at least one of the operational modes being active;
display a second notification on the human-machine-interface of the vehicle in response to at least one of the operational modes being not available;
operate the vehicle in the hands-on driving assistance mode by automatically activating a hands-on lane centering assistance mode without initiation by the driver, wherein the hands-on lane centering assistance mode is configured to control, while active, the lateral steering of the vehicle to direct the vehicle toward a center of a lane of a road on which the vehicle is traveling;
receive data that includes a status of an adaptive cruise control system of the vehicle configured to control a speed of the vehicle, an acceleration of the vehicle, a torque of the vehicle applied by the driver, and a status of an escalation and lockout system configured to prevent engagement of the hands-on lane centering assistance mode for a predetermined period of time based on preprogramed criteria including whether a driver's attention state satisfies attention conditions of the hands-on lane centering assistance mode; and
automatically transition between the operational modes without initiation by the driver based on a comparison of the data to preprogramed engagement conditions of the hands-on lane centering assistance mode.

9. A method, comprising:
automatically transitioning, with a processor, between multiple operational modes of a vehicle without initiation a driver of the vehicle, wherein the operational modes include a hands-off autonomous driving mode in which a processor controls lateral steering of the vehicle while the driver is not required to hold a steering wheel of the vehicle, a hands-on driving assistance mode in which the processor controls the lateral steering of the vehicle while the driver is required to hold the steering wheel of the vehicle, and a no control mode in which the driver of the vehicle controls the lateral steering of the vehicle, wherein automatically transitioning between the operational modes of the vehicle is based on sensed driver activity and vehicle dynamics, wherein the hands-off autonomous driving mode is prioritized over the hands-on driving assistance mode and the hands-on driving assistance mode is prioritized over the no control mode;
displaying, with the processor, a first notification on a human-machine-interface of the vehicle in response to at least one of the operational modes being active;
displaying, with the processor, a second notification on the human-machine-interface of the vehicle in response to at least one of the operational modes being not available;
operating, with the processor, the vehicle in the hands-on driving assistance mode including automatically activating a hands-on lane centering assistance mode without initiation by the driver, wherein the hands-on lane centering assistance mode is configured to control, while active, the lateral steering of the vehicle to direct the vehicle toward a center of a lane of a road on which the vehicle is traveling; and
automatically transitioning, with the processor, between the hands-on lane centering assistance mode and a lane keep assist mode without initiation by the driver in response to the hands-off autonomous driving mode and the hands-on driving assistance mode both being unavailable, wherein the lane keep assist mode is configured to intermittently control, while active, the lateral steering of the vehicle to reduce a likelihood of the vehicle unintentionally exiting the lane of the road.

10. The method of claim 9, further comprising, by the processor:
receiving data that includes a status of an adaptive cruise control system of the vehicle configured to control a speed of the vehicle, an acceleration of the vehicle, a torque of the vehicle applied by the driver, and a status of an escalation and lockout system configured to prevent engagement of the hands-on lane centering assistance mode based on preprogramed criteria including whether a driver's attention state satisfies attention conditions for the hands-on lane centering assistance mode; and wherein automatically transitioning between the operational modes without initiation by the driver includes comparing the data to preprogramed conditions of the hands-on lane centering assistance mode.

11. The method of claim 9, further comprising automatically transitioning, by the processor, the vehicle into the no control mode and a lane departure warning mode without initiation by the driver in response to the hands-off autonomous driving mode and the hands-on driving assistance mode both being unavailable, wherein the lane departure warning mode is configured to generate a warning in response to determining that the vehicle is likely to unintentionally exit the lane of the road.

12. The method of claim 9, further comprising, by the processor:

receiving data that includes a speed of the vehicle;

determining a cross over speed zone in which first conditions of the hands-on lane centering assistance mode are satisfied, second conditions for engagement of the lane keep assist mode are satisfied, and only one of the hands-on lane centering assistance mode and the lane keep assist mode are active and in control of the lateral steering of the vehicle and a hysteresis speed zone in which both the hands-on lane centering assistance mode and the lane keep assist mode are active while only one is in control of the lateral steering of the vehicle; and automatically transitioning between the hands-on lane centering assistance mode and the lane keep assist mode using the cross over speed zone and the hysteresis speed zone.

13. The method of claim 9, further comprising, by the processor:

determining that an adaptive cruise control (ACC) system of the vehicle configured to control a speed of the vehicle is active, wherein the adaptive cruise control system is configured to maintain the speed of the vehicle at a set speed;

receiving data that includes the speed of the vehicle; and automatically deactivating the hands-on lane centering assistance mode when the speed of the vehicle exceeds the set speed by a difference in excess of an ACC threshold.

14. The method of claim 9, further comprising, by the processor:

receiving data that includes a torque of the vehicle applied by the driver; and automatically activating a collaborative steering submode of the hands-on lane centering assistance mode without initiation by the driver in response to detecting that the torque applied by the driver is greater than a first torque threshold and less than a second torque threshold, and detecting that the vehicle is likely to unintentionally exit the lane of the road, wherein while the collaborative steering submode is active the lateral steering of the vehicle is simultaneously controlled by both the hands-on lane centering assistance mode and the driver to direct the vehicle toward the center of the lane of the road.

15. The method of claim 14, further comprising, by the processor:

receiving data that includes a detection of an obstacle on a lateral side of the vehicle and distances from markings of the lane of the road; and automatically controlling the lateral steering of the vehicle with the collaborative steering submode of the hands-on lane centering assistance mode in response to the detection of the obstacle on the lateral side of the vehicle to direct the vehicle away from the obstacle.

16. The method of claim 9, wherein the automatically transitioning, by the processor, between the operational modes of the vehicle without initiation by the driver is performed based on a single software algorithm.

* * * * *